US009699666B2

(12) United States Patent
Lerbour et al.

(10) Patent No.: US 9,699,666 B2
(45) Date of Patent: Jul. 4, 2017

(54) METHOD OF OPTIMIZING THE QUALITY OF A CELLULAR NETWORK

(75) Inventors: Regis Lerbour, Boulogne-Billancourt (FR); Gregory Donnard, Ottawa (CA); Yann Le Le Helloco, Ottawa (CA)

(73) Assignee: INFOVISTA SAS, Les Ulis (FR)

( * ) Notice: Subject to any disclaimer, the term of this patent is extended or adjusted under 35 U.S.C. 154(b) by 168 days.

(21) Appl. No.: 13/458,806

(22) Filed: Apr. 27, 2012

(65) Prior Publication Data

US 2012/0276893 A1 Nov. 1, 2012

(30) Foreign Application Priority Data

Apr. 29, 2011 (FR) ...................................... 11 53706

(51) Int. Cl.
*H04W 24/02* (2009.01)
*H04W 16/18* (2009.01)

(52) U.S. Cl.
CPC .................................. *H04W 24/02* (2013.01)

(58) Field of Classification Search
CPC ........ H04W 24/00; H04W 24/02; H04B 1/38; G01S 1/00; H04Q 7/00
USPC ...................... 455/422.1, 444–449
See application file for complete search history.

(56) References Cited

U.S. PATENT DOCUMENTS

| 6,829,491 | B1 | 12/2004 | Yea et al. | |
|---|---|---|---|---|
| 7,586,438 | B1 * | 9/2009 | Lawrence | G01S 19/07 342/357.4 |
| 8,625,534 | B2 * | 1/2014 | Wang | H04W 28/18 370/230.1 |
| 8,761,752 | B2 * | 6/2014 | Erceg | H04W 24/02 455/418 |
| 9,331,892 | B2 * | 5/2016 | Lindberg | H04L 41/00 |
| 2005/0254455 | A1 * | 11/2005 | Plehn | H04W 16/18 370/328 |
| 2008/0225687 | A1 * | 9/2008 | Oksman | H04L 41/0893 370/201 |
| 2008/0242290 | A1 * | 10/2008 | Bhatia | H04L 12/5895 455/422.1 |
| 2009/0059786 | A1 * | 3/2009 | Budampati | H04L 45/00 370/230 |

(Continued)

FOREIGN PATENT DOCUMENTS

| WO | WO 98/53621 A2 | 11/1998 |
|---|---|---|
| WO | WO 2004/073243 A2 | 8/2004 |

OTHER PUBLICATIONS

Search Report dated Nov. 28, 2011 issued in corresponding French Application No. 1153706.

*Primary Examiner* — Khawar Iqbal
(74) *Attorney, Agent, or Firm* — Greer, Burns & Crain, Ltd.

(57) ABSTRACT

A method of optimizing the quality of a cellular network which includes at least one iteration, each iteration including a step of estimating at least one local performance indicator at a plurality of points of the cellular network as a function of parameters of the cellular network; a step of estimating a global quality level of the cellular network for the parameters on the basis of a local quality level as estimated at each of the points and for the parameters, the local quality level depending exclusively on the local performance indicators, the parameters being modified so long as the global quality level can be improved; and a step of storing the parameters corresponding to the global quality level.

7 Claims, 2 Drawing Sheets

(56) References Cited

U.S. PATENT DOCUMENTS

| | | | |
|---|---|---|---|
| 2010/0105372 A1* | 4/2010 | Aoyama | H04W 16/18 455/418 |
| 2011/0090820 A1* | 4/2011 | Hussein | H04W 72/04 370/255 |
| 2011/0151884 A1* | 6/2011 | Zhao | H04W 72/1205 455/452.1 |
| 2012/0052873 A1* | 3/2012 | Wong | 455/456.1 |
| 2012/0155317 A1* | 6/2012 | Shepard | H04W 76/023 370/252 |
| 2016/0285586 A1* | 9/2016 | Struhsaker | H01Q 1/246 |

* cited by examiner

METHOD OF OPTIMIZING THE QUALITY OF A CELLULAR NETWORK

BACKGROUND OF THE INVENTION

The present invention relates to a method and a device for improving the quality of a cellular telecommunications network.

In general, optimizing a cellular network consists in estimating whether the global quality of the network, under certain assumptions concerning its parameters, satisfies certain predetermined criteria, and in varying the parameters or the criteria in order to tend towards optimized performance.

In the present state of the art, the criteria used may be classified amongst: coverage criteria; interference criteria; capacity criteria; and non-coverage criteria.

These criteria present the major drawback of needing to be defined relative to performance thresholds.

For example, a coverage criterion is meaningful only in association with a minimum required field level on which it is possible to base optimization.

These thresholds may be constant and predefined in the optimization tool, or they may be adjustable by the user.

For example, the document "Towards automatic cell planning" by R. Kapp Rawnsley and S. Hurley; Department of Computer Science, Cardiff University, Cardiff CF24 3XF, published in 2000 under the number 0-7803-6465-5/00 describes an optimization method in which use is made of two optimization criteria that are associated with thresholds that need to be defined by the user, namely:

a coverage criterion defined relative to a signal-to-noise ratio threshold set at 14 decibels (dB); and a capacity criterion defined relative to a traffic threshold set at 43 Erlangs.

The document "Methodology for WiMax performance optimization using drive test data" by F. Alghamidi, I. Kostanic, the 8$^{th}$ International Conference on Computing, Communications Control Technologies, Orlando, Fla., Apr. 6-9, 2010 proposes a method of optimizing a cellular network in which a coverage threshold in terms of field level is calculated automatically on the basis of the bandwidth and on the basis of a noise factor of the receiver.

In any event, defining thresholds associated with optimization criteria is tricky and difficult to optimize, regardless of whether these thresholds are determined empirically or automatically.

Furthermore, performance criteria based on such minimum performance thresholds do not guarantee the global performance of the network. For example, if the minimum field level is found to be too low, because it has already been reached over the entire coverage of the cellular network, or too high since it cannot be reached, then optimization has no effect.

Consequently, the invention seeks to provide a method and a device for optimizing a cellular telecommunications network in which there is no need to define a threshold level.

OBJECT AND SUMMARY OF THE INVENTION

Thus, and in a first aspect, the invention provides a method of optimizing the quality of a cellular network. This method comprises at least one iteration, each iteration comprising:

a step of estimating at least one local performance indicator at a plurality of points of the network as a function of parameters of the network;

a step of estimating a global quality level of the network for these parameters on the basis of a local quality level as estimated at each of the points and for the parameters, the local quality level depending exclusively on the local performance indicators;

the parameters being modified so long as the global quality level can be improved; and a step of storing the parameters corresponding to the optimum global quality level.

Correspondingly, the invention also provides a device for optimizing the quality of a cellular network, the device comprising means for implementing, in iterative manner so long as it is possible to improve a global quality level of the network that depends on parameters of the network:

means for modifying these parameters;

means for estimating at least one local performance indicator at a plurality of points of the network, as a function of parameters of the network;

means for estimating the global quality level for the parameters on the basis of an estimate of a local quality level at each of the points and for the parameters, the local quality levels depending exclusively on the local performance indicators; and means for storing the parameters corresponding to the optimum global quality level.

In the meaning of the present invention, a "performance indicator" designates any data serving to measure, estimate, or represent a performance level of the network. Such an indicator presents the major advantage of not needing to be quantified, i.e. there is no need to define a (minimal or maximum) threshold for asserting the quality of the network.

For example, the coverage of the network does not constitute a performance indicator but only an availability indicator. It can happen that the signal level is sufficient to cover a given zone but that the interference levels in said zone are too high to permit high-quality communication or even to enable communication to be set up.

Interference criteria, that are sometimes used in addition to coverage criteria, likewise do not constitute performance indicators in the meaning of this patent.

In contrast, data rate or spectral efficiency (the quantity of information that can be transmitted during an interval of time while using a certain frequency bandwidth) are performance indicators in the meaning of the invention.

In general, the invention thus makes it possible to optimize a cellular telecommunications network without the user having any need to define threshold, in other words any need to define an objective. In particular, there is no need to define a coverage criterion or an interference criterion.

The optimization method and system of the invention are thus extremely simple for the user to use.

Furthermore, and in very advantageous manner, the result of the optimization, which does not depend any longer on possibly erroneous or unsuitable thresholds, is optimum under all circumstances.

This result also presents the advantage of being directly associated with the quality of the network as perceived by its users.

The invention also makes it possible to take account of improvements stemming from using multiple antennas, which is not possible with any method known in the prior art.

In a particular implementation, the various steps of the optimization method are determined by computer program instructions.

Consequently, the invention also provides a computer program on a data medium, the program being suitable for being implemented by a computer, the program including instructions adapted to implementing the steps of the optimization method as specified above.

The program may make use of any programming language, and it may be in the form of source code, object code, or of code intermediate between source code and object code, such as in a partially compiled form, or in any other desirable form.

The invention also provides a computer readable data medium that includes computer program instructions as mentioned above.

The data medium may be any entity or device capable of storing the program. For example, the medium may include storage means such as a read only memory (ROM), e.g. a compact disk (CD) ROM, or a micro electronic circuit ROM, or indeed magnetic recording means, such as a floppy disk or a hard disk.

Furthermore, the data medium may be a transmissible medium such as an electrical or optical signal, which may be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description given with reference to the drawings that show an embodiment without any limiting character. In the figures.

DETAILED DESCRIPTION OF THE INVENTION

Figure 1:
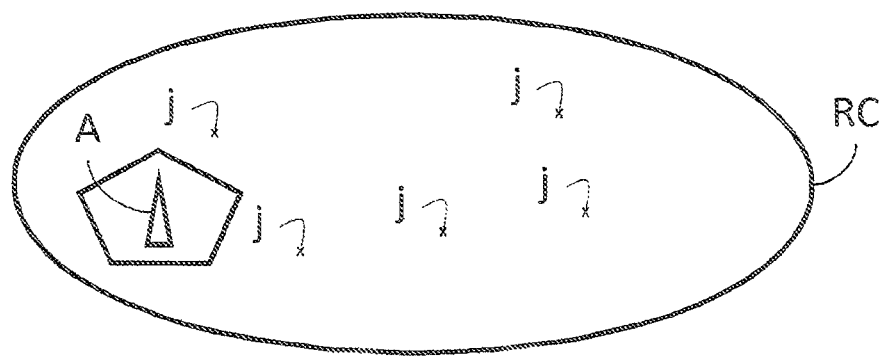
FIG. 1 shows a network suitable for being optimized by implementing the invention.

FIG. 1 shows a cellular telecommunications network RC in which it is possible to implement the invention. For reasons of legibility, only one cell is shown, which is defined by the range of an antenna A.

The figure shows a certain number of points j constituting meshing of this network.

Figure 2:
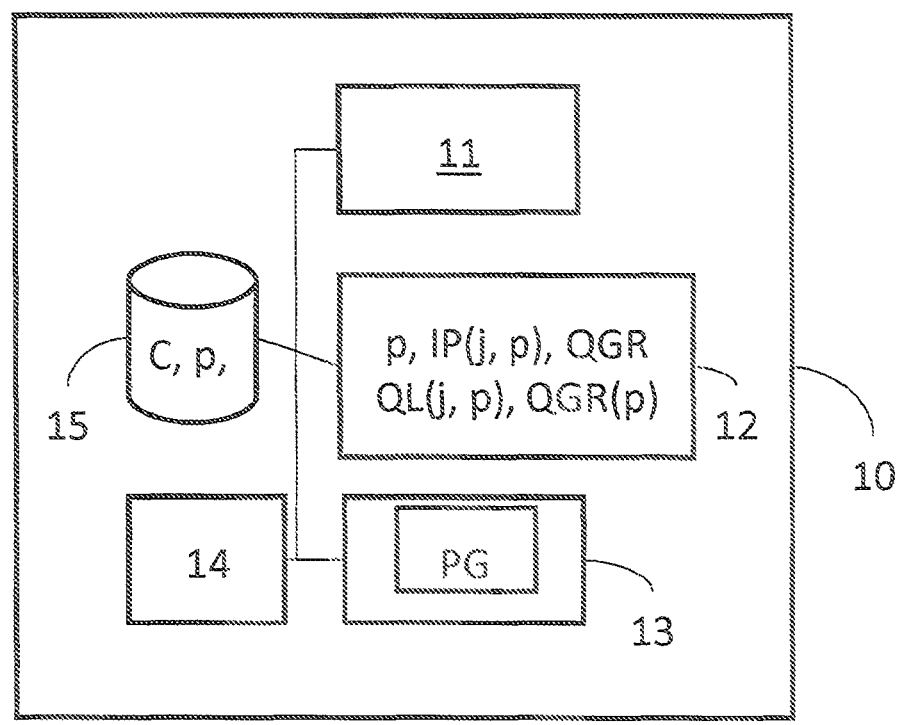
FIG. 2 is a diagram of an optimization device in accordance with a particular embodiment of the invention.

FIG. 2 shows a device 10 for optimizing the cellular network RC. The device has the hardware architecture of a conventional computer. It comprises a processor 11, a random access memory (RAM) 12, a ROM 13, a user interface 14, and a non-volatile memory 15 constituting a database.

In this embodiment, the database includes a map C of the network RC serving to define the points j.

Figure 3:
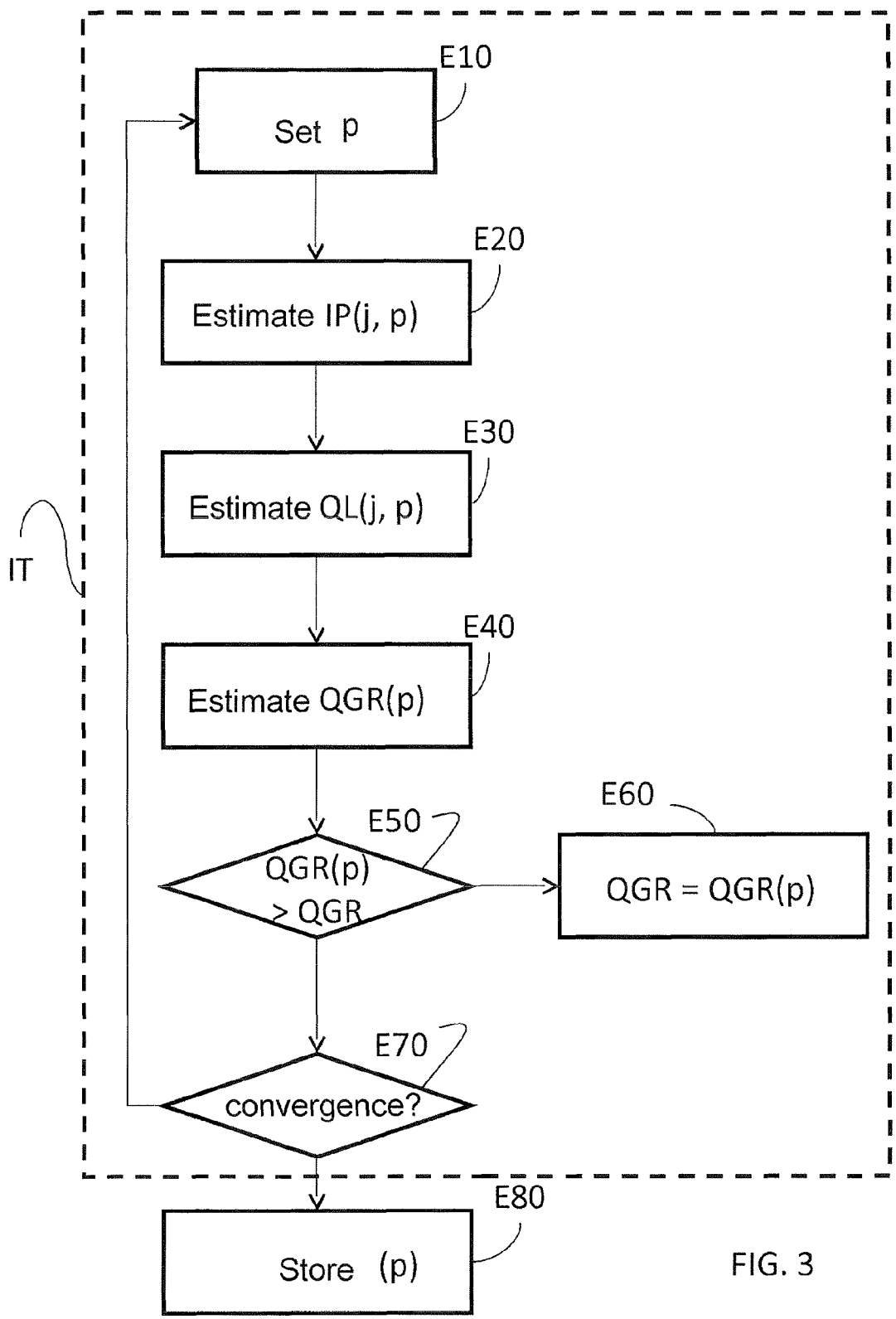
FIG. 3 is a flow chart showing the main steps of an optimization method in accordance with a particular implementation of the invention.

The ROM 13 constitutes a recording medium in the meaning of the invention. This recording medium is readable by the processor 11 and includes a computer program PG having instructions for executing the steps of an optimization method of the invention as described below with reference to FIG. 3.

The method may comprise a plurality of iterations IT, each constituted by steps E10 to E70.

During step E10, parameters p of the network RC are set. These parameters may in particular be constituted by the number, the positions, and the orientations of antennas A. In this embodiment, the configuration of each antenna is represented by its orientation in the horizontal plane (azimuth) and in a vertical plane (tilt) together with its properties that can be modified remotely (e.g. electric tilt). The power transmitted by each antenna is also included in the parameters p.

Thereafter, during a step E20, a performance indicator IP(p,j) is determined as a function of the parameters p and each of the points j.

In this implementation, only one performance indicator is used, namely the spectral efficiency of the network at this point.

During a step E30, a local quality level QL(j,p) is then estimated for the network RC at each of said points j, for the parameters p set in step E10.

In accordance with the invention, the local quality levels QL(j,p) depend exclusively on the local performance indicators IP(j,p).

In this implementation, the level QL(j,p) is the local performance indicator IP(j,p), in other words the spectral efficiency of the network at this point j.

Thereafter, during a step E40, a global quality level QGR(p) is estimated for the network RC for the parameters p, on the basis of the local quality level QL(j,p) estimated in step E30.

During a test E50, it is determined whether the global quality level QGR(p) is greater than a current global quality level QGR, that is initialized at zero.

If it is, then during a step E60 the global quality level QGR(p) calculated in step E40 is given to the current global quality level QGR.

Thereafter, in a test E70, it is determined whether the current global quality level QGR can be optimized. If so, the method returns to E10 in order to modify the parameters p, for a new iteration IT.

Once the optimization method no longer converges, the result of the test E70 becomes negative and the parameters associated with said optimum global quality level are stored in a step E80, e.g. in the non-volatile memory 15.

These parameters can then be used in order to configure the network RC.

The RAM 12 is arranged to store the variables needed to execute the program PG, and in particular:
parameters p;
the local performance indicators IP(j,p);
the local quality levels QL(j,p); and
the global quality level QGR(p).

In the above-described implementation, only one performance indicator is used, namely the spectral efficiency of the network at each point.

In a variant, it is possible for example to use a second performance indicator constituted by an estimate of the data rates at the points j of the network.

In this variant, the local quality level QL(j,p) of the network RC at each of said points j for the parameters p set in step E10 may, for example, be constituted by the product of the spectral efficiency as estimated for said point multiplied by the data rate as estimated for this point.

What is claimed is:

1. A method of optimizing the quality of a cellular network, the method comprising at least one iteration, each iteration comprising the steps of:
estimating at least one local performance indicator at a plurality of points covered by antennas of the cellular network as a function of parameters of the antennas of the cellular network, wherein said at least one local performance indicator includes estimating a data rate at a given bandwidth for the plurality of points covered by the antennas and said at least one local performance indicator comprises data regarding an aspect of network performance not defined by a threshold level, and wherein said at least one performance indicator is not one of said parameters;

estimating a global quality level of the cellular network for said parameters on the basis of a local quality level as estimated at each of said points and for said parameters, said local quality level depending exclusively on said at least one local performance indicator;

said parameters being modified based on the global quality level of the cellular network for said parameters; and storing said parameters corresponding to said global quality level.

2. The method according to claim 1, wherein said local performance indicator at a point represents the data rate or the spectral efficiency at said point.

3. A computer program stored non-transitorily on a computer readable data medium, including instructions for executing the steps of the optimization method of claim 1 when said program is executed by a computer.

4. A computer readable recording medium having non-transitorily recorded thereon a computer program including instructions for executing the steps of the optimization method according to claim 1.

5. The method according to claim 1, wherein said points are defined by a map of the cellular network.

6. A device for optimizing the quality of a cellular network, the device comprising means for implementing, in iterative manner so long as it is possible to improve a global quality level of said cellular network that depends on parameters of said cellular network, the device comprising:

means for modifying said parameters;

means for estimating at least one local performance indicator including a data rate at a plurality of points of the cellular network, as a function of parameters of antennas of the cellular network, said means for estimating configured for estimating the data rate at a given bandwidth for the plurality of points covered by the antennas, wherein said at least one local performance indicator comprises data regarding an aspect of network performance not defined by a threshold level, and wherein said at least one performance indicator is not one of said parameters;

means for estimating said global quality level for said parameters on the basis of an estimate of a local quality level at each of said points and for said parameters, said local quality levels depending exclusively on said at least one local performance indicator; and means for storing said parameters corresponding to said optimum global quality level.

7. A method of optimizing the quality of a cellular network, the method comprising at least one iteration, each iteration comprising the steps of:

estimating at least one local performance indicator including a data rate at a plurality of points covered by antennas of the cellular network as a function of parameters of the antennas of the cellular network, wherein each of said plurality of points is a physical location of a terminal in the cellular network, and wherein said at least one local performance indicator comprises data regarding an aspect of network performance of at least one terminal that is not defined by a threshold level, and wherein said at least one performance indicator is not one of said parameters;

wherein estimating the at least one local performance indicator includes estimating the data rate at a given bandwidth for the plurality of points covered by the antennas, estimating a global quality level of the cellular network for said parameters on the basis of a local quality level as estimated at each of said points and for said parameters, said local quality level depending exclusively on said at least one local performance indicator;

said parameters being modified based on the global quality level of the cellular network for said parameters; and storing said parameters corresponding to said global quality level.

* * * * *